(12) United States Patent
Stoll et al.

(10) Patent No.: US 8,740,519 B2
(45) Date of Patent: Jun. 3, 2014

(54) TOOL HOLDER ASSEMBLY

(75) Inventors: Alexander Stoll, Plymouth, MI (US); Ed Exner, Troy, MI (US); George Nordstrom, Sterling Heights, MI (US)

(73) Assignee: Ford Motor Company, Dearborn, MI (US)

( * ) Notice: Subject to any disclaimer, the term of this patent is extended or adjusted under 35 U.S.C. 154(b) by 756 days.

(21) Appl. No.: 12/971,614

(22) Filed: Dec. 17, 2010

(65) Prior Publication Data

US 2011/0085864 A1  Apr. 14, 2011

Related U.S. Application Data

(63) Continuation of application No. 11/162,545, filed on Sep. 14, 2005, now Pat. No. 7,896,591, and a continuation-in-part of application No. 10/710,787, filed on Aug. 3, 2004, now abandoned.

(51) Int. Cl.
*B23Q 11/10* (2006.01)

(52) U.S. Cl.
USPC ............... 409/136; 408/56; 408/57; 279/20

(58) Field of Classification Search
USPC ............ 409/135, 136, 234; 408/56, 57, 59; 279/20

IPC ........................................................ B23Q 11/10
See application file for complete search history.

(56) References Cited

U.S. PATENT DOCUMENTS

| | | | |
|---|---|---|---|
| 3,460,410 A * | 8/1969 | Briles | 408/57 |
| 5,649,714 A | 7/1997 | Uchida et al. | |
| 2003/0103819 A1* | 6/2003 | Sugata et al. | 408/57 |

FOREIGN PATENT DOCUMENTS

| | | | | |
|---|---|---|---|---|
| DE | 19835677 A1 * | 1/2000 | | B23Q 11/10 |
| DE | 10157450 A1 * | 6/2003 | | B23B 31/02 |
| EP | 245604 A2 * | 11/1987 | | B23B 51/06 |
| EP | 1072356 A2 * | 1/2001 | | B23Q 11/10 |

\* cited by examiner

*Primary Examiner* — Daniel Howell
*Assistant Examiner* — Michael Vitale
(74) *Attorney, Agent, or Firm* — Damian Porcari; Brooks Kushman P.C.

(57) ABSTRACT

A tool holder assembly including a cutting tool and a tool holder. The cutting tool includes at least one fluid passage. The tool holder includes a conduit and a bore adapted to receive the cutting tool. An adapter or adapter portion may be provided that provides a fluid to one or more fluid passages in the cutting tool.

19 Claims, 3 Drawing Sheets

TOOL HOLDER ASSEMBLY

CROSS-REFERENCE TO RELATED APPLICATIONS

This application is a continuation of U.S. application Ser. No. 11/162,545, which is a continuation-in-part of U.S. application Ser. No. 10/710,787 filed Aug. 3, 2004.

BACKGROUND OF THE INVENTION

1. Field of the Invention

The present invention relates to a tool holder assembly, and more particularly to a tool holder assembly incorporating an adapter configured to deliver a fluid to a cutting tool.

2. Background Art

Previously, drill chucks incorporated a fluid supply hole adapted to receive a straight shank of an oil-through-drill, as described in U.S. Pat. No. 5,649,714. In that patent, a seal block was positioned in the fluid supply hole to regulate fluid flow into a fluid channel of the oil-through-drill and into a gap portion between the fluid supply hole and the straight shank portion. Such drill chucks did not address the desirability of gap-free sealing between a cutting tool and an adapter to inhibit fluid leakage and improve tool life. Moreover, such drill chucks were not configured for use with a minimum quantity lubrication (MQL) machining system in which very limited amounts of lubricant are provided at high pressure to the cutting surfaces of the cutting tool to sustain the machining process. In addition, such chucks did not incorporate adjustment screws to facilitate the axial positioning of the cutting tool.

Before Applicants' invention, there was a need for a tool holder assembly that was compatible with an MQL machining system and facilitated the supply of pressurized fluid to the cutting surfaces of a cutting tool while inhibiting fluid leakage. In addition, there was a need to incorporate the functionality of an adjustment screw to accurately position the cutting tool without the need to manufacture, position, and install a separate adjustment screw component. Problems associated with the prior art as noted above and other problems are addressed by Applicants' invention as summarized below.

SUMMARY OF THE INVENTION

In at least one embodiment a tool holder assembly is provided. The tool holder assembly includes a cutting tool, a tool holder and an adapter. The tool holder has a bore that receives the cutting tool and a conduit disposed adjacent to the bore. The adapter has a body portion and a tool receiving portion. The body portion is disposed in the conduit that has a first fluid passage. The tool receiving portion is disposed in the bore that has second and third fluid passages that extend from the first fluid passage to the cutting tool.

In at least one embodiment a tool holder assembly is provided. The tool holder assembly includes a tool holder and a cutting tool. The tool holder has a bore and a conduit disposed adjacent to the bore. The cutting tool has a main portion disposed in the bore and an adapter portion disposed in the conduit. The adapter portion is integral with the main portion and has an internal fluid passage and a plurality of fluid passages. The internal fluid passage is configured to provide a fluid to a chamber disposed in the cutting tool. The plurality of fluid passages are configured to receive the fluid from the chamber.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
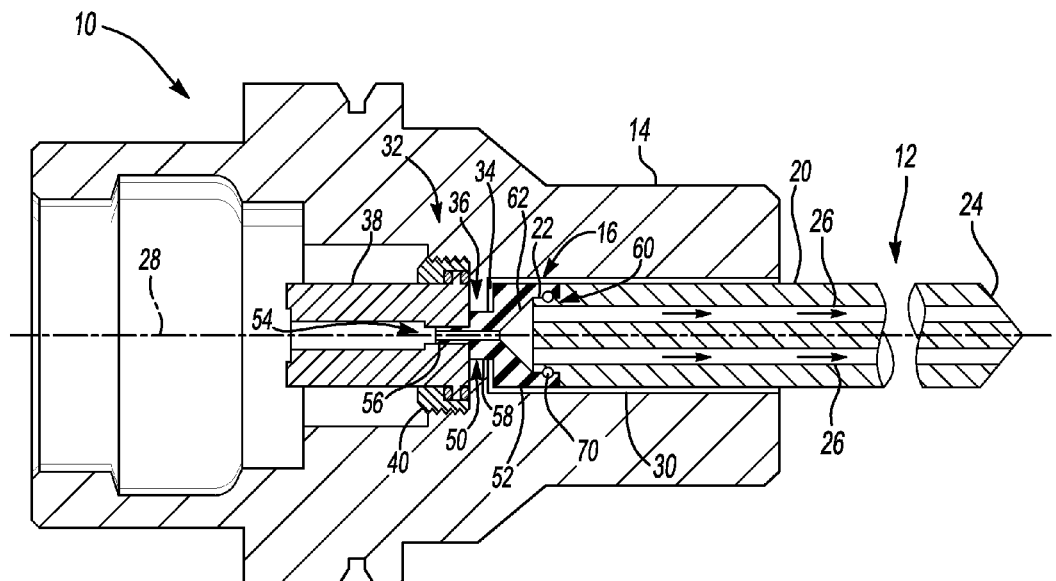
FIG. 1 is a section view of a first embodiment of a tool holder assembly.

Referring to FIG. 1, one embodiment of a tool holder assembly 10 is shown. In this embodiment, the tool holder assembly 10 includes a cutting tool 12, a tool holder 14, and an adapter 16.

The cutting tool 12 includes a shank or main portion 20, an end portion 22, one or more cutting surfaces 24, and one or more fluid passages 26. The cutting tool 12 may have any suitable configuration and may be of any suitable type, such as a chamfer tool, bore, drill, mill, reamer, or tap.

The end portion 22 is disposed proximate the main portion 20. The end portion 22 may have any suitable configuration for mating with the adapter 16. In the embodiment shown in FIG. 1, the end portion 22 has a male configuration and a smaller diameter than the main portion 20. Alternatively, the end portion 22 may be provided with a female configuration and the adapter 16 may have a male configuration in one or more embodiments of the present invention, such as those described below. In addition, the end portion 22 may have a generally planar, contoured, or chamfered end surface that helps position or center the cutting tool 12.

The fluid passages 26 extend through the cutting tool 12 and are configured to provide a fluid proximate the cutting surface 24. The fluid passages 26 may have any suitable configuration. In the embodiment shown in FIG. 1, the fluid passages 26 are aligned generally parallel to and spaced apart from an axis of rotation 28.

The tool holder 14 is configured to hold the cutting tool 12 and rotate about the axis of rotation 28. More specifically, the tool holder 14 is configured to be connected to a spindle or other suitable device that is adapted to rotate the tool holder 14. The tool holder 14 may be of any suitable type, such as shrink fit holder, collet or chuck, such as a hydraulic chuck. Also, the tool holder 14 may be made of any suitable material, such as a polymeric material or a metal.

The tool holder 14 includes a bore 30 and a conduit 32. The bore 30 is adapted to receive the cutting tool 12 and includes a bottom surface 34. The bore 30 may have any suitable configuration for receiving and holding the cutting tool 12. For example, the bore 30 may be generally circular, square, rectangular, or any other shape or combinations of shapes. Optionally, the cutting tool 12 may be secured to the tool holder 14 in any suitable manner, such as with one or more set screws as is known by those skilled in the art.

The conduit 32 is adapted to provide a fluid to the cutting tool 12. For example, the conduit 32 may be connected to a fluid supply pipe or fluid source that is adapted to provide any suitable fluid, such as a coolant or lubricant in the form of an aerosol, gas, or liquid. The conduit 32 may have any suitable configuration. For example, the conduit 32 may be integrally formed with the tool holder 14, may be a separate component attached to and extending through the tool holder 14, or may be defined by a combination of integrally formed tool holder surfaces and separate components. In the embodiment shown in FIG. 1, the conduit 32 includes a narrow portion 36 of the tool holder 14 and a pipe 38 coupled to the tool holder 14 with a fastener 40. Also, the conduit 32 may be disposed concentrically with the axis of rotation 28 and may have a smaller size or inside dimension or diameter than the bore 30.

The adapter 16 includes a body portion 50 and a tool receiving portion 52. The adapter 16 is configured to engage or receive the end portion 22 to inhibit fluid leakage and help position the cutting tool 12. The adapter 16 may be made of any suitable material, such as a polymeric material or a metal.

The body portion 50 and the tool receiving portion 52 cooperate to define an internal fluid passage 54. The internal fluid passage 54 may be disposed coaxially with the conduit 32.

The body portion 50 is adapted to engage the conduit 32. More specifically, the body portion 40 may be configured to attach to or seal against the inside of the conduit 32 to inhibit fluid leakage. The body portion 50 may have any suitable configuration. In the embodiment shown in FIG. 1, the body portion 50 includes a first section 56 disposed proximate the pipe 38 and a second section 58 disposed proximate the narrow portion 36. Alternatively, the second section 58 may be omitted and the first section 56 may extend from the bottom surface of the tool receiving portion 52. Optionally, the first or second sections 56,58 may have a threaded portion disposed on an exterior surface.

In at least one embodiment, the tool receiving portion 52 may include a socket or recess 60 adapted to receive the cutting tool 12. More specifically, the recess 60 may have a similar configuration as the end portion 22. Optionally, the recess 60 may have a larger size or outside dimension or diameter than the body portion 50 to help position the adapter 16 within the bore 30. Alternatively, the tool receiving portion 52 may have a male configuration as previously described or a combination of male and female portions in any of the embodiments of the present invention having an adapter and a cutting tool.

The adapter 16 may include a chamfer 62 disposed in the recess 60 proximate the internal fluid passage 54 to improve fluid flow and fluid distribution to the fluid passages 26. More particularly, the chamfer 62 and centrifugal forces present when the tool holder assembly 10 is rotated cooperate to direct fluid from the internal fluid passage 54 outward to the fluid passages 26. Of course, the chamfer 62 may be omitted in one or more embodiments of the present invention.

Optionally, a seal 70 may be disposed between the tool receiving portion 52 and the end portion 22 to further inhibit fluid leakage. If a seal is provided, it may be disposed in any suitable location or locations and may have any suitable configuration. In at least one embodiment, the seal 70 may be at least partially disposed in a groove located on the end portion 22 and/or the tool receiving portion 52. Alternatively, a groove may be omitted in one or more embodiments of the present invention. In other embodiments, the seal 70 may be configured to provide a face seal in which the seal 70 is disposed between end surfaces of the tool 12 and the adapter 16. In addition, the seal 70 may be held in position in various ways, such as by friction or an adhesive.

Figure 2:
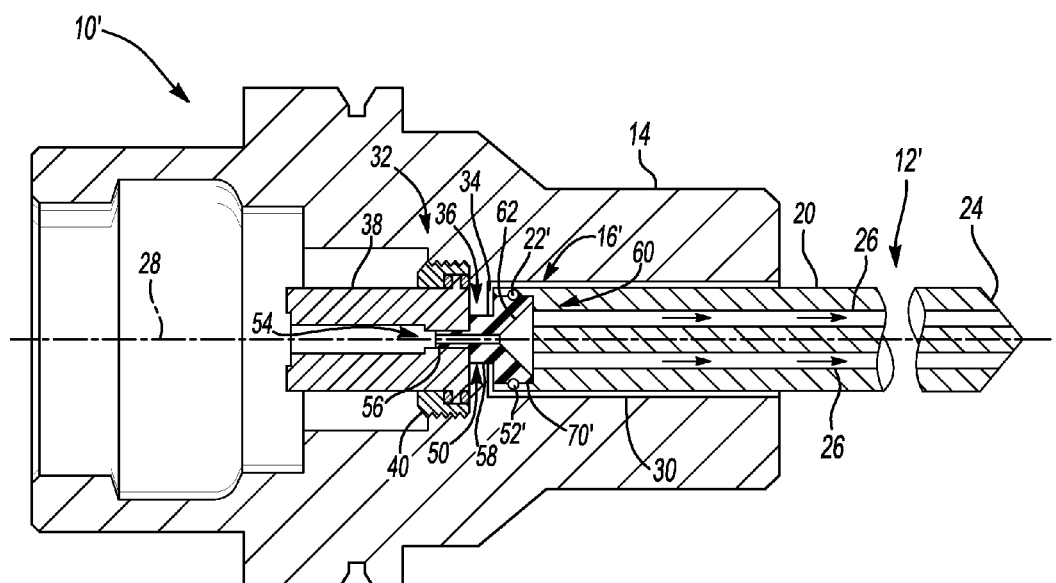
FIG. 2 is a section view of a second embodiment of the tool holder assembly.

Referring to FIG. 2, another embodiment of a tool holder assembly 10' is shown. In this embodiment, the tool holder assembly 10' includes a cutting tool 12' having an end portion 22' that has a female configuration, an adapter 16' having a tool receiving portion 52' that has a male configuration, and a seal 70'. If a seal is provided, it may be disposed in any suitable location or locations. In at least one embodiment, the seal 70' may be at least partially disposed in a groove located on the end portion 22' and/or the tool receiving portion 52'. Alternatively, a groove may be omitted in one or more embodiments of the present invention. In other embodiments, the seal 70' may be configured to provide a face seal in which the seal 70' is disposed between end surfaces of the tool 12 and the adapter 16. In addition, the seal 70' may be held in position in various ways, such as by friction or an adhesive.

In addition, adapters having different configurations may be associated with each type or size of cutting tool. For example, adapters wherein the first and/or second sections 56, 58 have different geometries or cross-sections for each tool may be employed to help insure that the correct adapter is used with a particular cutting tool.

Figure 3:
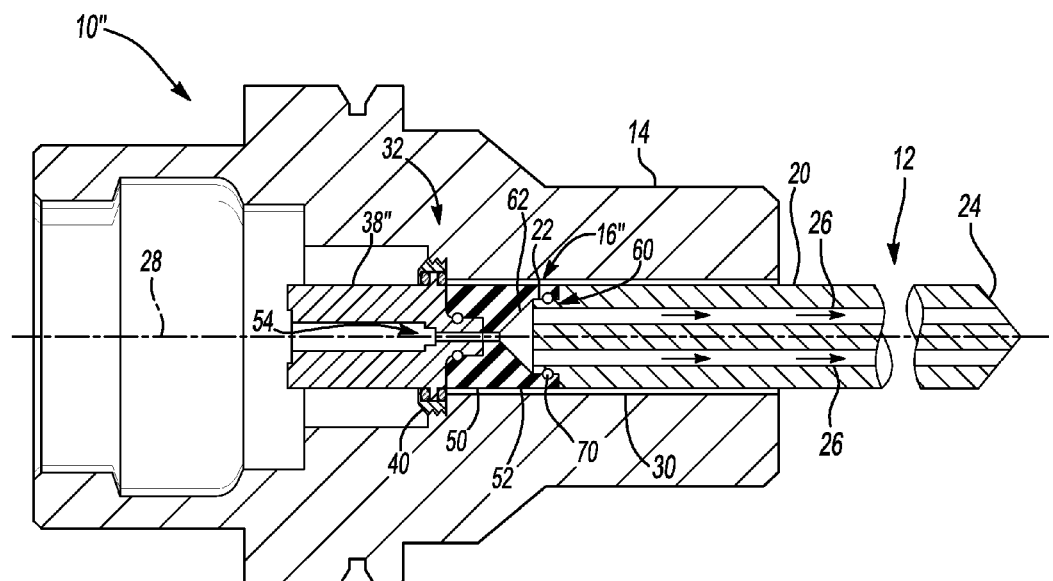
FIG. 3 is a section view of a third embodiment of the tool holder assembly.

Referring to FIG. 3, a third embodiment of the tool holder assembly 10" is shown. In this embodiment, the tool holder assembly 10" includes an adapter 16" having an inlet end having a female configuration that may mate with a pipe 38" having a male configuration. In at least one embodiment, a seal may be provided to inhibit fluid leakage between the pipe 38" and the adapter 16". If a seal is provided, it may be disposed in any suitable location or locations. Optionally, the seal may be at least partially disposed in a groove disposed on the pipe 38" and/or the adapter 16". Alternatively, a groove may be omitted in one or more embodiments of the present invention. In other embodiments, the seal may be configured to provide a face seal in which the seal is disposed between end surfaces of the pipe 38" and the adapter 16". In addition, the seal may be held in position in various ways, such as by friction or an adhesive. Moreover, the present invention contemplates that any of the adapters described herein may be configured with a male or a female configuration to provide compatibility with an associated supply pipe. For instance, the embodiment shown in FIG. 3 may have a female configuration rather than a male configuration.

Figure 4:
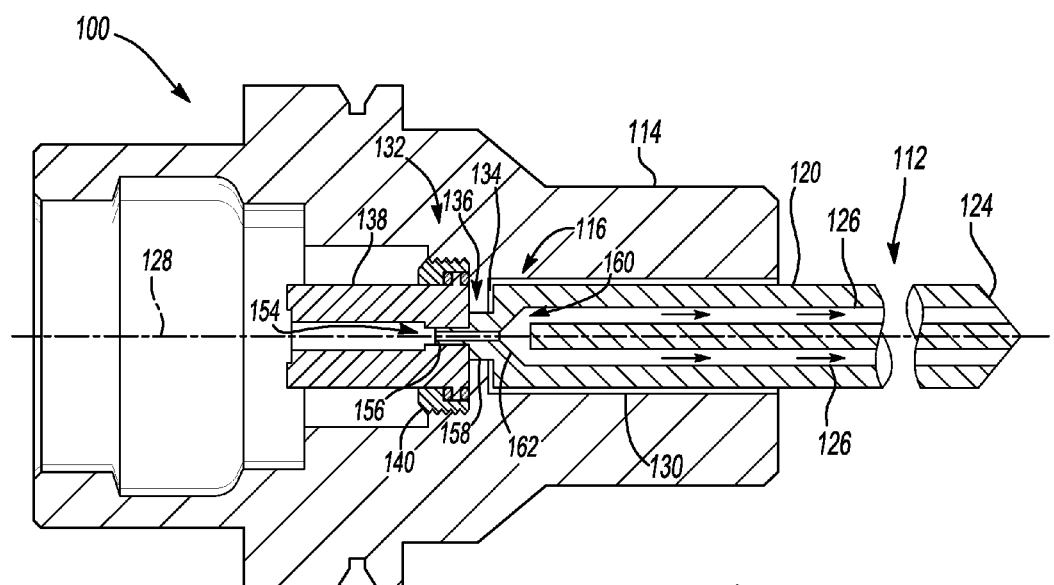
FIG. 4 is a section view of a fourth embodiment of the tool holder assembly.

Referring to FIG. 4, a fourth embodiment of the tool holder assembly 100 is shown. In this embodiment, the tool holder assembly 100 includes a cutting tool 112 and a tool holder 114 having an integral adapter portion 116.

The cutting tool 112 includes a main portion 120, one or more cutting surfaces 124, one or more fluid passages 126, and may be rotatable about an axis of rotation 128 as previously described.

The tool holder 114 includes a bore 130 and a conduit 132. The bore 130 has a bottom surface 134. The conduit 132 may have any suitable configuration and may include a narrow portion 136 and/or a pipe 138 coupled to the tool holder 114 with a fastener 140 as previously described.

The adapter portion 116 includes an internal fluid passage 154. In the embodiment shown in FIG. 4, the internal fluid passage 154 also extends partially into the main portion 120. The adapter portion 116 may also have a first section 156 disposed proximate the pipe 138 and a second section 158 disposed proximate the narrow portion 136. In the embodiment shown, the first section 156 has a male configuration. In at least one other embodiment, the first section 156 may be provided with a female configuration to be compatible with a pipe 138 or portion thereof having a male configuration as previously described.

A chamber 160 may connect the internal fluid passage 154 and the tool fluid passages 126. The chamber 160 may include a tapered surface or chamfer 162 to improve flow and distribution to the fluid passages 126 as previously described.

Figure 5:
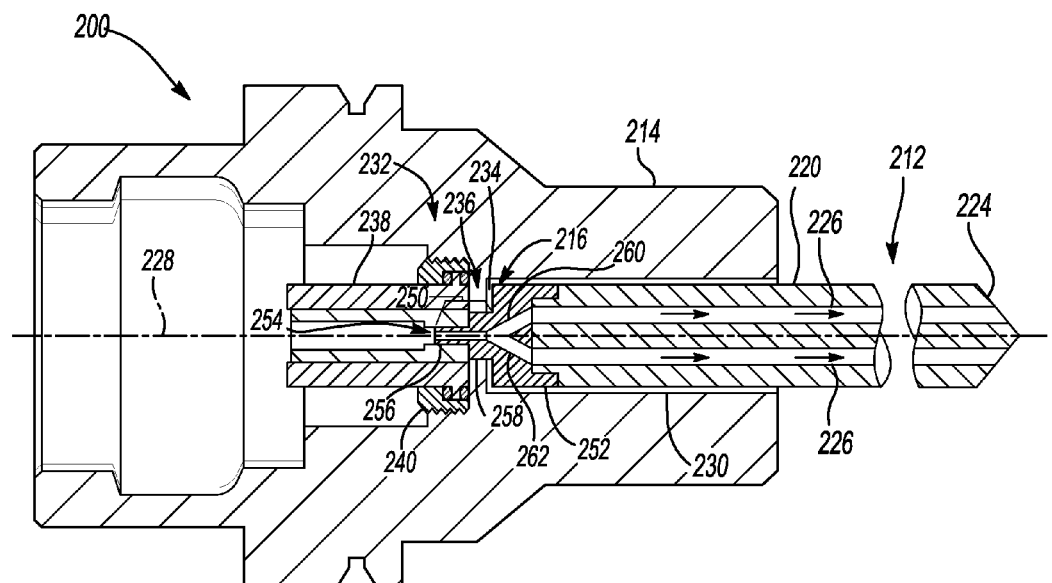
FIG. 5 is a section view of a fifth embodiment of the tool holder assembly.

Referring to FIG. 5, a fifth embodiment of the tool holder assembly 200 is shown. Similar to FIG. 1, the tool holder assembly 200 includes a cutting tool 212, a tool holder 214, and an adapter 216.

The cutting tool 212 may include a main portion 220, one or more cutting surfaces 224, a plurality of fluid passages 226, and may be rotatable about an axis of rotation 228 as previously described.

The tool holder 214 includes a bore 230 and a conduit 232. The bore 230 has a bottom surface 234. The conduit 232 may have any suitable configuration and may include a narrow portion 236 and/or a pipe 238 coupled to the tool holder 214 with a fastener 240 as previously described.

The adapter 216 may include a body portion 250 and a tool receiving portion 252, as previously described. The body portion 250 may also include a first internal fluid passage 254, a first section 256 disposed proximate the pipe 238 and a second section 258 disposed proximate the narrow portion 236. In the embodiment shown, the first section 256 has a male configuration. In at least one other embodiment, the first section 256 may be provided with a female configuration to be compatible with a pipe 238 or portion thereof having a male configuration as previously described.

The tool receiving portion 252 includes a plurality of additional fluid passages. In one embodiment, the tool receiving portion 252 includes second and third internal fluid passages 260, 262 connected to the first internal passage 254 and to different tool fluid passage 226. The first and/or second internal fluid passages 260, 262 may be angled or include a curved or tapered surface to improve fluid flow and distribution to the tool fluid passages 226.

Figure 6:
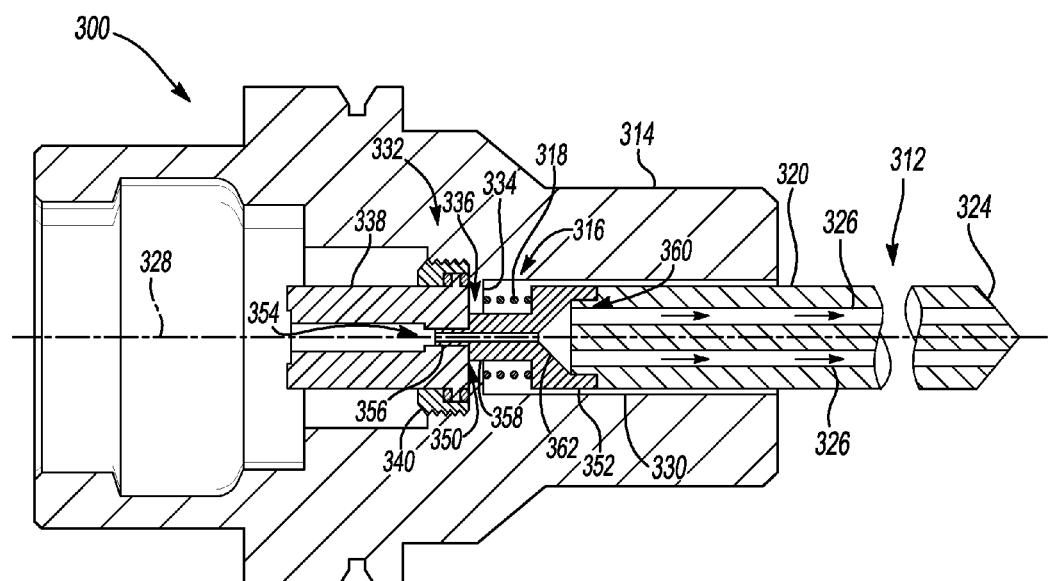
FIG. 6 is a section view of a sixth embodiment of the tool holder assembly.

Referring to FIG. 6, a sixth embodiment of the tool holder assembly 300 is shown. In this embodiment, the tool holder assembly 300 includes a cutting tool 312, a tool holder 314, an adapter 316, and a spring 318.

The cutting tool 312 may include a main portion 320, an end portion 322, one or more cutting surfaces 324, one or more fluid passages 326, and may be rotatable about an axis of rotation 328 as previously described.

The tool holder 314 includes a bore 330 and a conduit 332. The bore 330 has a bottom surface 334. The conduit 332 may include a narrow portion 336 and/or a pipe 338 coupled to the tool holder 314 with a fastener 340.

The adapter 316 may include a body portion 350, a tool receiving portion 352, and an internal fluid passage 354, a first section 356, a second section 358, a recess 360, and a chamfer 362 as previously described. In the embodiment shown, the first section 356 has a male configuration. In at least one other embodiment, the first section 356 may be provided with a female configuration to be compatible with a pipe 338 or portion thereof having a male configuration as previously described.

In any embodiment of the present invention, the tool holder assembly may be configured such that the depth in which the pipe 38, 38", 138, 238, 338 is inserted into the adapter 16, 16', 16", 116, 216, 316 or vice versa may be adjustable. For example, the pipe may be spring loaded rather than disposed in a fixed position relative to the tool holder 14, 114, 214, 314.

The spring 318 is adapted to engage the tool receiving portion 352 and the bottom surface 340 to bias the adapter 316 into engagement with the end portion 322 to position the tool and inhibit fluid leakage.

The tool holder assemblies 10, 100, 200, 300 described above may be employed with any suitable machining process or fluid delivery system. For example, the tool holder assemblies 10, 100, 200, 300 may be used with a minimum quantity lubrication (MQL) system. In an MQL system, a pressurized lubricating fluid, such as an oil mist, is provided through the tool holder 14, 114, 214, 314 and cutting tool 12, 112, 212, 312 to the cutting surfaces 24, 124, 224, 324. Fluid delivery is controlled to provide just enough lubrication to sustain the machining process. Consequently, it is desirable to provide gap-free sealing between the cutting tool 12, 112, 212, 312 and the adapter 16, 216, 316 or conduit to inhibit fluid leakage and improve tool life in at least one embodiment of the present invention. Providing gap-free sealing without manual intervention or manual adjustments to a tool positioning screw is desirable to help insure quality of the finished part. For example, gap-free sealing without manual adjustments is desirable in processes that "reuse" tools by regrinding or resharpening cutting surfaces and thereby alter the tool length.

While the best mode for carrying out the invention has been described in detail, those familiar with the art to which this invention relates will recognize various alternative designs and embodiments for practicing the invention as defined by the following claims.

What is claimed:

1. A tool holder assembly comprising:
   a cutting tool;
   a tool holder having a bore that receives the cutting tool and a conduit disposed adjacent to the bore; and
   an adapter having:
     a body portion disposed in the conduit that has a first fluid passage that extends through a first section and a second section of the body portion; and
     a tool receiving portion disposed in the bore that has second and third fluid passages that extend from the first fluid passage to the cutting tool;
   wherein the first section is spaced apart from the tool holder and wherein the second section extends from the first section to the tool receiving portion and engages the tool holder and the second section has a smaller diameter than the tool receiving portion and a larger diameter than the first section.

2. The tool holder assembly of claim 1 wherein the cutting tool is disposed in the tool receiving portion.

3. The tool holder assembly of claim 1 wherein the tool holder includes a narrow portion disposed adjacent to a bottom surface of the bore, wherein the adapter engages the bottom surface.

4. The tool holder assembly of claim 3 wherein the body portion of the adapter engages the narrow portion of the tool holder.

5. The tool holder assembly of claim 1 wherein the first section is disposed in a pipe that is disposed adjacent to the body portion and spaced apart from the bore.

6. The tool holder assembly of claim 5 wherein the tool holder includes a narrow portion disposed between the adapter and the pipe.

7. The tool holder assembly of claim 6 wherein the second section is disposed in the narrow portion of the tool holder.

8. A tool holder assembly comprising:
   a tool holder having a bore and a conduit disposed adjacent to the bore; and a cutting tool having:
  a main portion disposed in the bore; and
  an adapter portion disposed in the conduit that is integral with the main portion, the adapter portion having first and second sections that define an internal fluid passage configured to provide a fluid to a chamber disposed in the cutting tool, and a plurality of fluid passages that are configured to receive the fluid from the chamber;
wherein the second section extends from the first section to the main portion and engages the tool holder and the second section has a smaller diameter than the main portion and a larger diameter than the first section.

9. The tool holder assembly of claim 8 wherein the chamber has a chamfer that extends from the internal fluid passage to the plurality of fluid passages, the chamber being configured to direct fluid flow from the internal fluid passage to the plurality of fluid passages.

10. The tool holder assembly of claim 8 wherein the bore includes a bottom surface disposed adjacent to a narrow portion of the tool holder, wherein the adapter portion extends through and engages the narrow portion.

11. The tool holder assembly of claim 10 wherein the conduit includes a pipe disposed adjacent to the narrow portion, the pipe being configured to provide the fluid to the adapter portion.

12. The tool holder assembly of claim 11 wherein the first section is disposed at an end of the cutting tool and the second section disposed between the first section and the main portion.

13. The tool holder assembly of claim 12 wherein the second section is disposed in and engages the narrow portion of the tool holder.

14. The tool holder assembly of claim 12 wherein the first section is disposed in and engages the pipe.

15. The tool holder assembly of claim 8 wherein the plurality of fluid passages is disposed about and extends substantially parallel to an axis of rotation.

16. The tool holder of claim 15 wherein the internal fluid passage extends along the axis of rotation.

17. A tool holder assembly comprising:
a cutting tool having a plurality of fluid passages;
a tool holder having a bore that receives the cutting tool, a pipe disposed on the tool holder opposite the bore, and a narrow portion that defines an opening having a smaller diameter than the bore, the narrow portion being disposed between the bore and the pipe such that the pipe is not disposed in the opening; and
an adapter having a tool receiving portion that receives the cutting tool, a first section disposed in the pipe, a second section that is disposed in the opening and that engages the narrow portion, and an internal fluid passage that extends through the first and second sections and that is configured to provide fluid to the plurality of fluid passages;
wherein the second section extends from the first section to the tool receiving portion, the second section has a smaller diameter than the tool receiving portion and a larger diameter than the first section, and the pipe does not engage an outside diameter of the second section.

18. The tool holder assembly of claim 17 wherein the plurality of fluid passages intersect the internal fluid passage in the second section.

19. The tool holder assembly of claim 17 wherein the tool receiving portion is disposed in the bore that receives the cutting tool.

* * * * *